(12) United States Patent
Morita et al.

(10) Patent No.: US 7,234,814 B2
(45) Date of Patent: Jun. 26, 2007

(54) METHOD AND APPARATUS FOR REDUCING EYE FATIGUE

(75) Inventors: Mark Masao Morita, Arlington Heights, IL (US); Steve Lawrence Fors, Chicago, IL (US); Charles Cameron Brackett, Overland Park, KS (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 465 days.

(21) Appl. No.: 10/686,229

(22) Filed: Oct. 15, 2003

(65) Prior Publication Data
US 2005/0094098 A1 May 5, 2005

(51) Int. Cl.
*A61B 3/00* (2006.01)
(52) U.S. Cl. ...................................... 351/203
(58) Field of Classification Search ................ 351/203; 40/361, 548; 348/602; 362/11, 600, 602, 362/611–614, 559, 561
See application file for complete search history.

(56) References Cited

U.S. PATENT DOCUMENTS 5,515,069 A * 5/1996 Dillon, III .................... 345/6
6,076,928 A * 6/2000 Fateh et al. .................. 351/203
6,147,752 A * 11/2000 Hewitt et al. ............ 356/237.1

OTHER PUBLICATIONS

Dr. Jeffrey R. Anshel, BS, OD "Improving Visual Comfort at a Computer Workstation" Jan. 1999.*
Wendy Strouse Watt, O.D., "Computer Vision Syndrome and Computer Glasses" (www.mdsupport.org/library/cvs.html), Oct. 30, 2002.*
USB Flexible Snake Light, 2 pages, http://www.extremecomputing.com/snakelight.html, publication date unknown.
View Sonic: Products: LCD Displays, 3 pages, http://www.viewsonic.com/products/lcd.htm, publication date unknown.

* cited by examiner

*Primary Examiner*—Scott J. Sugarman
(74) *Attorney, Agent, or Firm*—Armstrong Teasdale LLP

(57) ABSTRACT

Some configurations of the present invention provide a method for reducing eye fatigue that includes adjusting an intensity of an essentially white light source behind a display device to set an ambient light level in a room behind the display device, and adjusting an intensity of a blue light source disposed beside the display device to dilate pupils of the eyes of a viewer of the display device.

32 Claims, 2 Drawing Sheets

METHOD AND APPARATUS FOR REDUCING EYE FATIGUE

BACKGROUND OF THE INVENTION

This invention relates generally to methods and apparatus for reducing eye fatigue, and more particularly to methods and apparatus for adjusting ambient lighting around various types of monitors, including LCD and CRT monitors, to reduce eye fatigue.

Liquid crystal displays (LCD) and cathode ray tube (CRT), displays well are known. (In this context as used herein, the terms "monitor" and "display" are considered synonymous. A "screen" is that part of the monitor or display upon which an image appears.) However, conditions in radiology reading rooms for reading these or other types of displays are not optimal for reducing eye fatigue or increasing accuracy of radiological studies. For example, many doctors turn off all lights to reduce screen glare on monitors. Studies indicate that radiologists experience eye fatigue under these conditions due to the increased contrast of the darkened room and a fully illuminated monitor screen (e.g., a CRT or LCD display screen). In addition, studies have also shown that the introduction of blue light into an environment results in dilation of the pupils of the eyes. When the pupils are dilated, the eyes are more focused and observational accuracy improves. Studies conducted with black-and-white images that were tinted using shade of blue to increase observational accuracy have found that radiologist found the blue-tinted images disturbing and out-of-sync with the black-and-white films they were trained to read.

Luminance variance between various types of images also contributes to eye fatigue. For example, radiologists studying breast mammograms must wait until their eyes have become acclimated before studying a CT or MR spine examination due to the greater average luminance of breast mammograms.

The use of separate lighting fixtures for ambient and environmental lighting is known. However, it can be inconvenient to adjust these separate fixtures for optimum lighting. Lighting attached to, or that attaches to a computer or display is also known, as is lighting that is powered by computer ports such as USB ports. However, known USB lighting is simple task lighting that does not adjust its intensity in accordance with information displayed on an associated computer screen. In addition, default display protocols (DDP) for medical images are known, but known protocols do not indicate or control optimal lighting parameters associated with examination types.

BRIEF DESCRIPTION OF THE INVENTION

There is therefore provided, in some configurations of the present invention, a method for reducing eye fatigue. The method includes adjusting an intensity of an essentially white light source behind a display device to set an ambient light level in a room behind the display device, and adjusting an intensity of a blue light source disposed beside the display device to dilate pupils of the eyes of a viewer of the display device.

Also in some configurations, the present invention provides a method for reducing eye fatigue that includes adjusting an intensity of an essentially white light source behind a display device to set an ambient light level in a room behind the display device. An intensity of a blue light source disposed beside the display device is adjusted to dilate pupils of the eyes of a viewer of the display device. The method also includes displaying a medical image on the display device. Adjusting an intensity of the white light source in these configurations includes adjusting an intensity of the white light source in accordance with a type of medical image displayed. Adjusting an intensity of the blue light source includes adjusting an intensity of the blue light source in accordance with the type of medical image displayed.

Moreover, some configurations of the present invention provide an apparatus for reducing eye fatigue. The apparatus includes a first light fixture and a second light fixture, a mount mechanically coupled to the first light fixture and the second light fixture and configured to attach to a rear portion of a display device so that the first light fixture is behind the display device and the second light fixture is beside the display device. The apparatus further includes a dimmer configured to separately control an intensity of lighting from the first light fixture and the second light fixture when the dimmer is powered and light sources are provided at the first light fixture and at the second light fixture.

Still other configurations of the present invention provide an apparatus for reducing eye fatigue that includes a stationary arm having a first light fixture, an arm mechanically coupled to the stationary arm and having a second light fixture, and a mount. The mount is mechanically coupled to the stationary arm and configured to attach the stationary arm to a rear portion of a display device so that the first light fixture is behind the display device and the second light fixture is beside the display device. The apparatus further includes a dimmer configured to separately control an intensity of lighting from the first light fixture and the second light fixture when the dimmer is powered and light sources are provided at the first light fixture and at the second light fixture.

Still other configurations of the present invention provide a display apparatus for reducing eye fatigue that includes a computer display, a first light fixture mechanically coupled to and behind the computer display and a second light fixture mechanically coupled to and at a side of the computer display. The apparatus further includes a dimmer configured to separately control an intensity of lighting from the first light fixture and the second light fixture, when the dimmer is powered and light sources are provided for the first light fixture and the second light fixture.

It will thus be observed that various configurations of the present invention reduce eye stress by providing an ambient light source and indirect blue lighting in rooms in which a display is read. Furthermore, various configurations of the present invention provide a reduction in eye stress and an increase in accuracy for reading of medical images. Some of these configurations advantageously adjust to reduce eye strain and increase accuracy automatically in accordance with the type of medical images being presented.

DETAILED DESCRIPTION OF THE INVENTION

Figure 1:
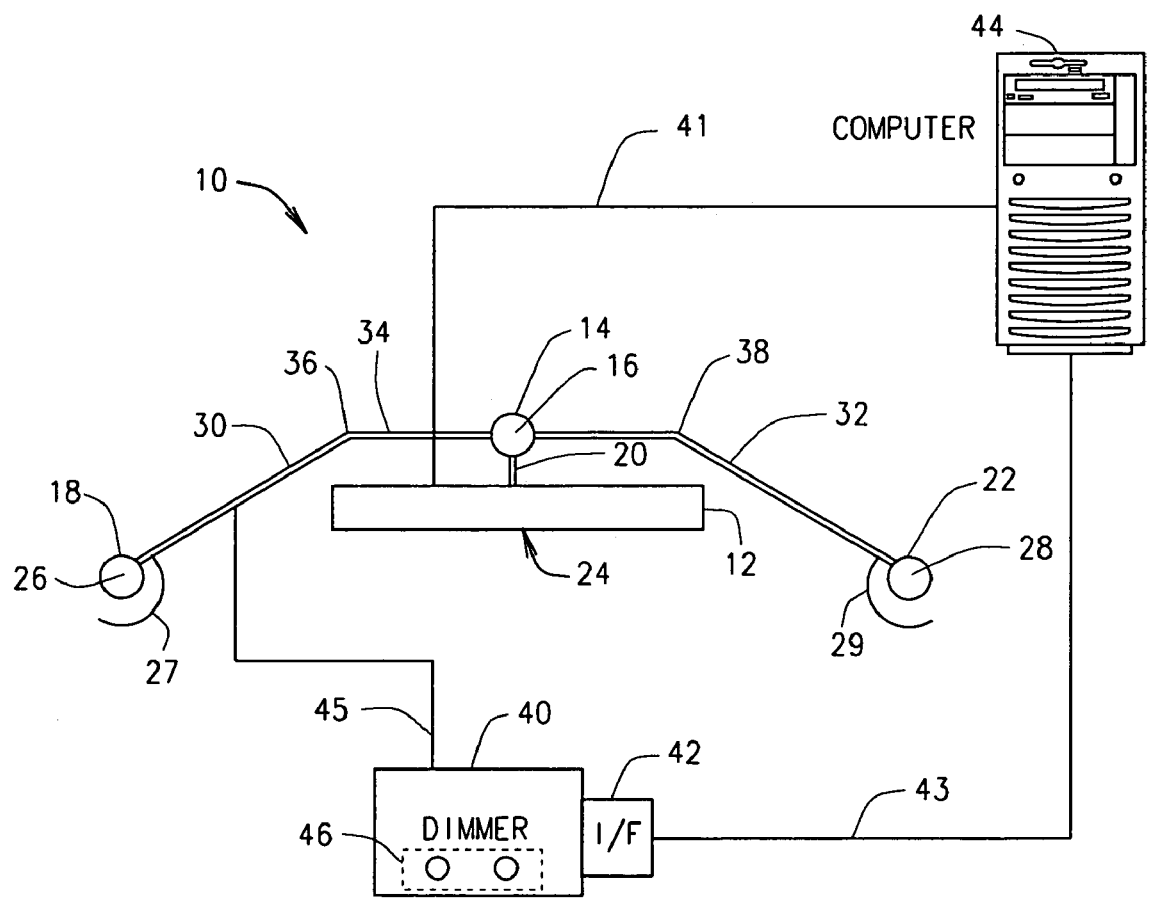
FIG. 1 is a drawing showing a top view representative of configurations of the present invention utilizing (or attached to) a liquid crystal display (LCD).
Figure 2:
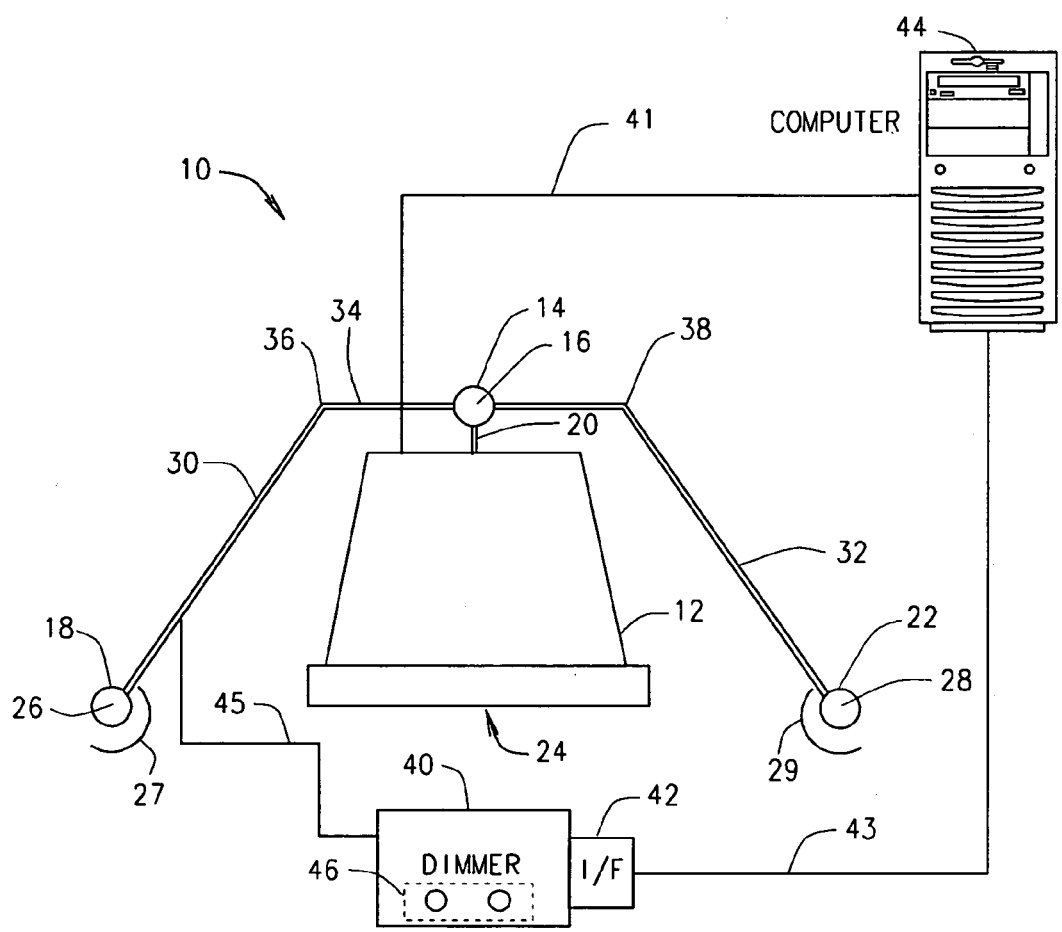
FIG. 2 is a drawing showing a top view representative of configurations of the present invention utilizing (or attached to) a cathode ray tube (CRT) display.

In some configurations of the present invention and referring to FIG. 1 and FIG. 2, a lighting apparatus 10 is provided that attaches to a display 12. Display 12 can be any type of lighted monitor, such as a lighted liquid crystal display (LCD) monitor as shown in FIG. 1 or a cathode ray tube (CRT) monitor as shown in FIG. 2 (both of which are denoted as display 12). Lighting apparatus 10 includes a first fixture 14 that can receive and power a light source. In an operating lighting apparatus 10, an essentially white light source 16, e.g., a white or off-white incandescent lamp, one or more white fluorescent lights, one or more solid state light sources such as white LEDs, or some combination thereof is inserted in first fixture 14 and receives power therefrom. It will be appreciated that first fixture 14 can include one or more sockets for one or more light sources, and that the light sources can be individual white lights or colored lights that combine to produce an essentially white light. Light source or sources 16 produce ambient light behind display 12 to illuminate a room in which display 12 is located.

It is to be understood that light emitted by white light sources vary in color temperature. For example, a glowing incandescent light bulb appears slightly yellowish or reddish when compared to most white fluorescent lights. Furthermore, light emitted by a glowing incandescent bulb may become more reddish when a dimmer reduces the intensity of the bulb. However, "essentially white," as that term is used herein, is intended to encompass all of these lighting cases.

Apparatus 10 includes a mount 20 mechanically coupled to first light fixture 14 and a second light fixture 18. In some configurations, a third light fixture 22 is also mechanically coupled to mount 20. Mount 20 is configured to attach to a rear portion of display 12 so that first light fixture 14 is behind display 12 (i.e., not visible by a person in front of monitor 12 who is viewing screen 24) when apparatus 10 is attached to display 12. Mount 20 is further configured (e.g., by its position on apparatus 10) so that second light fixture 18 is beside display 12. In some configurations, mount 20 is configured so that second light fixture 18 is beside and to the left of display 12 and third light fixture 22 is beside and to the right of display 12. ("Beside," as used herein, does not necessarily imply immediately adjacent to, but is intended to include configurations in which either of both second light fixture 18 and third light fixture 22 are spaced from the sides of display 12.)

In an operating lighting apparatus 10, a blue light source 26, e.g., a blue incandescent lamp, one or more blue fluorescent lights, one or more solid state light sources such as blue LEDs, or some combination thereof is inserted in second light fixture 18 and receives power therefrom. Another blue light source 28 is inserted in third light fixture 22 in configurations having a third light fixture. In some configurations, second light fixture 18 and/or third light fixture 22 are on telescoping and/or pivoting arms 30 and 32 mechanically coupled to a stationary arm 34 on which first light fixture 14 resides. Thus, light fixtures 14, 18 and 22 are all mechanically coupled to mount 20. Arms 30 and 32 permit blue light sources 26 and 28 to be positioned at selected and/or adjustable positions beside opposite sides of display 12. In some configurations, first light fixture 14 is mounted on a stationary arm 34. Stationary arm 34 in some configurations also has hinged attachment points 36 and 38 that attach to arms 30 and 32 respectively.

Figure 3:
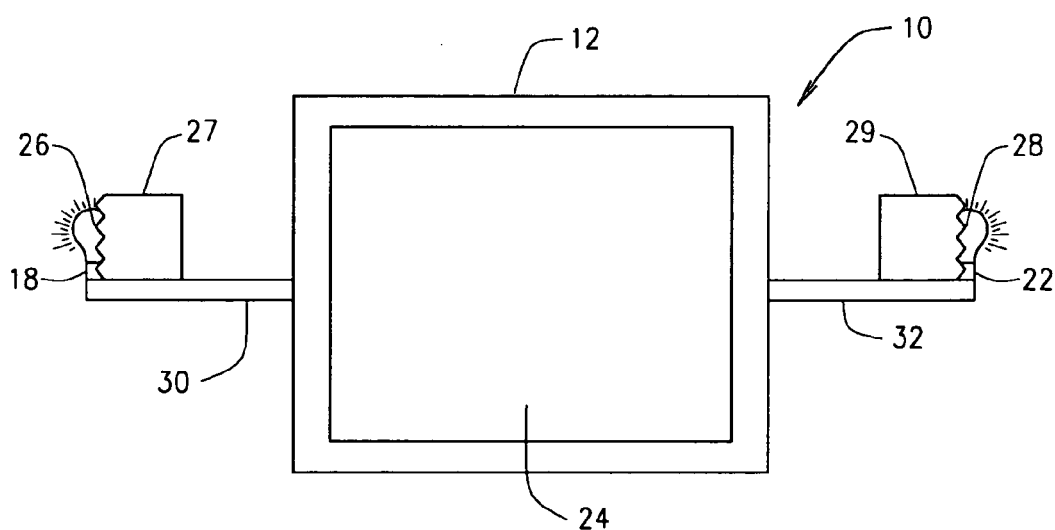
FIG. 3 is a drawing of a front view representative of the various configurations represented in FIGS. 1 and 2.

In some configurations, light sources 26 and/or 28 are positioned sufficiently in front of a plane of viewing screen 24 of display 12 to be just outside of the peripheral view of a person a viewing distance away (e.g., about 18 inches) from viewing screen 24. However, to provide indirect lighting rather than direct lighting, some configurations of the present invention include a shade 27 configured to prevent direct light from blue light source 26 from directly impinging into the eye of a viewer viewing screen 24. In various configurations having an additional blue light source 28, an additional shade 29 is also provided. The effect of shades 27 and 29 can be appreciated by reference to FIG. 3, in which shades 27 and 29 are shown in partial cut-away view to reveal light sources 26 and 28 behind them.

In some configurations of the present invention and referring again to FIGS. 1 and 2, lighting parameters (i.e., intensity combinations including blue light intensity and white light intensity) corresponding to various specific types of examinations (e.g., breast MG, CT spine, CR PA and lateral, etc.) are preset in a dimmer 40. The preset lighting parameters are selected to provide a favorable contrast and/or pupil dilation for each of the specific types of examinations and may take into account the average luminance of images in each type of examination. These lighting parameters are determined, in some configurations, from tests conducted on an appropriate population, for example, radiologists. Dimmer 40, in some configurations, includes an interface 42 that is configured to couple to a computer 44 that controls display device 12. Computer 44 controls display device 12 via interconnection 41 and also communicates a signal via wired or wireless interconnection 43 to dimmer 40. This signal is indicative of the type of medical image displayed on display 12, and dimmer 40 utilizes this signal to select one of the preset intensity combinations via interconnection 45 to device 10. Dimmer 40 dims or brightens light sources 16 and 26 (and 28, if present in the configuration) in accordance with the predetermined settings. In some configurations, computer 44 communicates signals indicative of actual intensity settings for light sources 16, 26 and 28 to dimmer 40 via interface 42, and dimmer 40 sets these intensities.

In some configurations, dimmer 40 is also (or alternatively) provided with a manual control 46 to set intensities (including intensities relative to one another) of light sources 16 and 26 (and 28, if present in the configuration) according to a viewer's own preferences. In some configurations, manual control 46 comprises independent controls for each light source 16, 26, and 28, or independent white and blue intensity controls, wherein, for example, the blue intensity control may control the intensity of more than one blue light source. Although not required by the invention, manual control 46 may additionally or alternatively provide a menu or selection switch from which a user can manually select one of the preset intensity combinations.

For the convenience of individuals installing or purchasing displays 12, some configurations of the present invention include display 12. For example, display 12 includes light sources (and, in some configurations, other features described above) pre-attached so that a user or installer of the display need not himself physically modify or attach additional components to display 12.

It will thus be appreciated that configurations of the present invention introduce ambient light in darkened reading rooms, and thus decrease eye fatigue that users, and particularly radiologists, experience from reading monitor displays in high contrast environments. Additionally, the introduction of blue light results in a dilation of the eyes, allowing increased reading accuracy of the monitor display. Furthermore, lag time associated with acclimation to various degrees of ambient and examination luminance is reduced in configurations having automatic control of lighting conditions.

While the invention has been described in terms of various specific embodiments, those skilled in the art will recognize that the invention can be practiced with modification within the spirit and scope of the claims.

What is claimed is:

1. A method for reducing eye fatigue comprising:
adjusting an intensity of an essentially white light source behind a display device to set an ambient light level in a room behind the display device;
adjusting an intensity of a blue light source disposed beside the display device to dilate pupils of the eyes of a viewer of the display device; and
presetting a plurality of light parameters of the essentially white light source and the blue light source, wherein the light parameters correspond to a plurality of medical examinations.

2. A method in accordance with claim 1 wherein said adjusting an intensity of an essentially white light source comprises adjusting an incandescent light source.

3. A method in accordance with claim 1 wherein said adjusting an intensity of the blue light source comprises adjusting an intensity of an incandescent blue light source.

4. A method in accordance with claim 1 wherein said adjusting an intensity of the blue light source comprises adjusting an intensity of a blue light source disposed beside a left side of the display device and adjusting an intensity of a blue light source disposed beside a right side of the display device.

5. A method in accordance with claim 1 wherein said white light source and said blue light source comprise light emitting diodes.

6. A method in accordance with claim 1 wherein said white light source comprises a fluorescent light source.

7. A method for reducing eye fatigue comprising:
adjusting an intensity of an essentially white light source behind a display device to set an ambient light level in a room behind the display device;
adjusting an intensity of a blue light source disposed beside the display device to dilate pupils of the eyes of a viewer of the display device; and
displaying a medical image on the display device,
wherein adjusting an intensity of the white light source further comprises adjusting an intensity of the white light source in accordance with a type of medical image displayed, and wherein adjusting an intensity of the blue light source further comprises adjusting an intensity of the blue light source in accordance with the type of medical image displayed.

8. A method in accordance with claim 7 wherein said adjusting an intensity of the blue light source comprises adjusting an intensity of a blue light source disposed beside a left side of the display device and adjusting an intensity of a blue light source disposed beside a right side of the display device.

9. A method in accordance with claim 7 further comprising separately controlling said white light intensity and said blue light intensity utilizing a dimmer with preset white light intensities and preset blue light intensities corresponding to selected types of medical images.

10. A method in accordance with claim 9 wherein said displaying a medical image on the display device comprises utilizing a computer to control the display device, and further comprising utilizing the computer to communicate a signal indicative of the type of medical image displayed on the display device to the dimmer, and utilizing the indicative signal to select a preset white light intensity and a preset blue light intensity.

11. An apparatus for reducing eye fatigue comprising:
a first light fixture;
a second light fixture;
a mount mechanically coupled to said first light fixture and said second light fixture and configured to attach to a rear portion of a display device so that said first light fixture is behind the display device and said second light fixture is beside the display device; and
a dimmer configured to separately control an intensity of lighting from said first light fixture and said second light fixture when said dimmer is powered and light sources are provided at said first light fixture and at said second light fixture, wherein said intensity of lighting corresponds to an image displayed on the display device.

12. An apparatus in accordance with claim 11 wherein said first light fixture and said second light fixture comprise electrical sockets configured to receive and power light sources.

13. An apparatus in accordance with claim 12 further comprising an essentially white light source in said first light fixture, and a blue light source in said second light fixture.

14. An apparatus in accordance with claim 13 further comprising a third light fixture, wherein said mount is further configured so that said second light fixture is beside a left side of the display device and said third light fixture is beside a right side of the display device when said mount is attached to the rear of the display device, wherein said dimmer is further configured control an intensity of lighting from said third light fixture separately from said first light fixture, and said apparatus further comprises a blue light source in said third light fixture.

15. An apparatus in accordance with claim 14 wherein said essentially white light source comprises an incandescent light source, and said blue light sources comprise incandescent light sources.

16. An apparatus in accordance with claim 11 further comprising an essentially white light source in said first light fixture, and a blue light source in said second light fixture, and further comprising a third light fixture and a blue light source in said third light fixture;
wherein said mount is further configured so that said second light fixture is beside a left side of the display device and said third light fixture is beside a right side of the display device when said mount is attached to the rear of the display device, and said dimmer is further configured control an intensity of lighting from said third light fixture separately from said first light fixture.

17. An apparatus in accordance with claim 16 wherein said essentially white light source comprises light emitting diodes, and said blue light sources comprise light emitting diodes.

18. An apparatus in accordance with claim 16 wherein said essentially white light source comprises a fluorescent light source.

19. An apparatus for reducing eye fatigue comprising:
a stationary arm having a first light fixture,
an arm mechanically coupled to said stationary arm and having a second light fixture;
a mount mechanically coupled to said stationary arm and configured to attach said stationary arm to a rear portion of a display device so that said first light fixture is behind the display device and said second light fixture is beside the display device; and a dimmer configured to separately control an intensity of lighting from said first light fixture and said second light fixture when said dimmer is powered and light sources are provided at said first light fixture and at said second light fixture, wherein said intensity of lighting corresponds to a plurality of medical examinations.

20. An apparatus in accordance with claim 19 further comprising an arm having a third light fixture, wherein said mount is configured so that, when attached to the rear portion of the display device, said second light fixture is left of the display device and said third light fixture is right of the display device.

21. An apparatus in accordance with claim 20 wherein said arm having the second light fixture and said arm having the third light fixture are telescoping.

22. An apparatus in accordance with claim 20 wherein said arm having the second light fixture and said arm having the third light fixture are hinged to said stationary arm.

23. An apparatus in accordance with claim 20 wherein said dimmer includes a selection of preset intensity combinations.

24. An apparatus in accordance with claim 23 wherein said dimmer comprises a computer interface, and said dimmer is responsive to a signal input to said computer interface to select one of said preset intensity combinations.

25. An apparatus in accordance with claim 20 further comprising shades configured to shade light sources in said second light fixture and said third light fixture from an observer looking at a monitor to which the apparatus is attached.

26. A display apparatus for reducing eye fatigue comprising:

a computer display;

a first light fixture mechanically coupled to and behind said computer display;

a second light fixture mechanically coupled to and at a side of the computer display; and a dimmer configured to separately control an intensity of lighting from said first light fixture and said second light fixture, when said dimmer is powered and light sources are provided for said first light fixture and said second light fixture, wherein said intensity of light corresponds to an image displayed on said computer display.

27. A display apparatus in accordance with claim 26 wherein the second light fixture is at a left side of the computer display and further comprising a third light fixture mechanically coupled to and at a right side of the computer display, and said dimmer is further configured to control an intensity of lighting from said third light fixture when said dimmer is powered and a light source is provided for said third light fixture.

28. A display apparatus in accordance with claim 27 further comprising an essentially white light source in said first light fixture, a blue light source in said second light location, and a blue light source in said third light location.

29. A display apparatus in accordance with claim 28 wherein said second light fixture and said third light fixture are on separate arms mechanically coupled to said stationary arm.

30. An apparatus in accordance with claim 28 further comprising shades configured to shade said blue light sources from eyes of a viewer of said computer display.

31. A display device in accordance with claim 27 wherein said dimmer includes a selection of preset intensity combinations.

32. An apparatus in accordance with claim 30 wherein said dimmer comprises a computer interface, and said dimmer is responsive to a signal input to said computer interface to select one of said preset intensity combinations.

\* \* \* \* \*